United States Patent
Ideshio et al.

(10) Patent No.: US 9,097,330 B2
(45) Date of Patent: Aug. 4, 2015

(54) VEHICLE POWER TRANSMISSION DEVICE

(75) Inventors: Yukihiko Ideshio, Nisshin (JP); Terufumi Miyazaki, Toyota (JP); Toshihiko Kamiya, Toyota (JP); Shingo Eto, Gamagori (JP); Hironori Asaoka, Nisshin (JP); Yasuyuki Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 13/989,266

(22) PCT Filed: Nov. 24, 2010

(86) PCT No.: PCT/JP2010/070901
§ 371 (c)(1),
(2), (4) Date: Jul. 3, 2013

(87) PCT Pub. No.: WO2012/070119
PCT Pub. Date: May 31, 2012

(65) Prior Publication Data
US 2013/0277163 A1    Oct. 24, 2013

(51) Int. Cl.
*F16H 45/02* (2006.01)
*B60K 6/36* (2007.10)
*B60K 6/48* (2007.10)
*F16H 41/24* (2006.01)
(Continued)

(52) U.S. Cl.
CPC ............ *F16H 41/24* (2013.01); *B60K 6/365* (2013.01); *B60K 6/48* (2013.01); *F16H 45/02* (2013.01); *B60K 2006/4825* (2013.01); *F16H 2045/002* (2013.01); *F16H 2045/0205* (2013.01); *F16H 2045/0247* (2013.01); *F16H 2045/0252* (2013.01); *F16H 2045/0294* (2013.01); *Y02T 10/6221* (2013.01); *Y02T 10/6252* (2013.01)

(58) Field of Classification Search
USPC ................................................. 192/3.25, 3.26
See application file for complete search history.

(56) References Cited

U.S. PATENT DOCUMENTS

| | | | |
|---|---|---|---|
| 6,217,476 B1 * | 4/2001 | Muller et al. ...................... | 477/5 |
| 8,622,182 B2 * | 1/2014 | Iwase et al. .................. | 192/3.33 |
| 2008/0142325 A1 | 6/2008 | Degler et al. | |

(Continued)

FOREIGN PATENT DOCUMENTS

| JP | Y1-46-26487 | 9/1971 |
|---|---|---|
| JP | U-1-122537 | 8/1989 |

(Continued)

*Primary Examiner* — Richard Lorence
(74) *Attorney, Agent, or Firm* — Oliff PLC

(57) ABSTRACT

It is provided a vehicle power transmission device having a hydraulic power transmission device and a power transmission mechanism, the hydraulic power transmission device including an input-side rotating member that houses an output-side rotating member disposed with turbine blades and fluid flowing from pump blades to turbine blades, the vehicle power transmission device having an engine intermittent clutch and a lockup clutch disposed closer to an engine relative to the turbine blades in the input-side rotating member, one of the engine intermittent clutch and the lockup clutch being a single plate clutch, the vehicle power transmission device further comprising an electric motor, and the hydraulic power transmission device including a first damper inserted in a power transmission path between the crankshaft of the engine and the electric motor, and a second damper inserted in a power transmission path between the first damper and the output-side rotating member.

9 Claims, 4 Drawing Sheets

(51) Int. Cl.
    *B60K 6/365*    (2007.10)
    *F16H 45/00*    (2006.01)

(56) References Cited

U.S. PATENT DOCUMENTS

| | | |
|---|---|---|
| 2008/0149440 A1 | 6/2008 | Sturgin |
| 2008/0156608 A1 | 7/2008 | Kombowski |
| 2008/0308375 A1 | 12/2008 | Heeke |
| 2009/0032351 A1 | 2/2009 | Uhler |
| 2009/0045023 A1 | 2/2009 | Uhler |
| 2009/0054203 A1 | 2/2009 | Heeke |
| 2010/0062899 A1* | 3/2010 | Engelmann et al. ............ 477/86 |
| 2010/0105519 A1 | 4/2010 | Kasuya et al. |

FOREIGN PATENT DOCUMENTS

| | | |
|---|---|---|
| JP | A-2007-22112 | 2/2007 |
| JP | A-2008-121710 | 5/2008 |
| JP | A-2008-138877 | 6/2008 |
| JP | A-2009-2511 | 1/2009 |
| JP | A-2010-105450 | 5/2010 |
| KR | 10-0755046 B1 | 9/2007 |

* cited by examiner

VEHICLE POWER TRANSMISSION DEVICE

TECHNICAL FIELD

The present invention relates to a structure of a vehicle power transmission device making up a portion of a power transmission path between an engine and drive wheels.

BACKGROUND ART

A vehicle power transmission device is known that includes a hydraulic power transmission device having an input-side rotating member disposed with a plurality of pump blades and an output-side rotating member disposed with a plurality of turbine blades receiving a fluid flow from the pump blades, and a power transmission mechanism transmitting power input to an input shaft from the hydraulic power transmission device to a subsequent stage, in a power transmission path between an engine and drive wheels. For example, this corresponds to those described in Patent Documents 1 to 3.

PRIOR ART DOCUMENTS

Patent Documents

Patent Document 1: Japanese Laid-Open Patent Publication No. 2010-105450
Patent Document 2: Japanese Laid-Open Patent Publication No. 2008-138877
Patent Document 3: Korean Patent Publication No. KR100755046 (B1)

SUMMARY OF THE INVENTION

Problem to Be Solved by the Invention

In the conventional vehicle power transmission device, it is desired to further reduce the entire axial length of the vehicle power transmission device to improve mountability on a vehicle. In this regard, for example, it is conceivable that constituent members of a hydraulic power transmission device are made thinner in an axial center direction of the hydraulic power transmission device to shorter axial lengths to reduce a distance in the axial center direction occupied by the hydraulic power transmission device in the vehicle power transmission device, thereby reducing the entire axial length of the vehicle power transmission device. However, the thinning of the constituent members is limited. The following is considered as one of the factors making the hydraulic power transmission device longer in the axial center direction. A multiplate clutch formed with relatively large number of parts makes up each of an engine intermittent clutch selectively coupling a crankshaft of an engine to an input-side rotating member and a lockup clutch selectively coupling the input-side rotating member to an output-side rotating member, housed in an outer shell cover of the hydraulic power transmission device.

The present invention was conceived in view of the situations and it is therefore an object of the present invention to provide a vehicle power transmission device including a hydraulic power transmission device and enabling a shorter entire axial length.

Means for Solving the Problem

To achieve the object, the present invention provides (a) a vehicle power transmission device having a hydraulic power transmission device and a power transmission mechanism in a power transmission path between an engine and drive wheels, the hydraulic power transmission device including an input-side rotating member disposed with a plurality of pump blades and an output-side rotating member disposed with a plurality of turbine blades receiving a fluid flow from the pump blades, the power transmission mechanism transmitting power input to an input shaft from the hydraulic power transmission device to a subsequent stage, (b) the input-side rotating member being provided with the pump blades internally disposed on the power transmission mechanism side and having a function of an outer shell cover, the outer shell cover housing the output-side rotating member disposed with the turbine blades opposite to the pump blades and fluid flowing from the pump blades to the turbine blades, (c) the vehicle power transmission device having an engine intermittent clutch and a lockup clutch disposed closer to the engine relative to the turbine blade in the input-side rotating member, the engine intermittent clutch selectively coupling a crankshaft of the engine to the input-side rotating member, the lockup clutch selectively coupling the input-side rotating member to the output-side rotating member, (d) one of the engine intermittent clutch and the lockup clutch being a single plate clutch, (e) the vehicle power transmission device further comprising an electric motor disposed on a second axial center parallel to an axial center of the hydraulic power transmission device and operatively coupled to the input-side rotating member, and (f) the hydraulic power transmission device including a first damper inserted in a power transmission path between the crankshaft of the en Me and the electric motor, and a second damper inserted in a power transmission path between the first damper and the output-side rotating member within a power transmission path between the electric motor and the input shaft of the power transmission mechanism to partially or entirely overlap with the first damper when viewed in the direction orthogonal to the axial center.

Consequently, since the parts count of one of the engine intermittent clutch and the lockup clutch may be reduced and the distance of the hydraulic power transmission device occupied by the one of the clutches can be made smaller in the axial center direction in the outer shell cover of the hydraulic power transmission device, the length of the outer shell cover of the hydraulic power transmission device can be made shorter in the axial center direction. Therefore, the entire axial length of the vehicle power transmission device can be made shorter. For example, vehicle fuel efficiency can be improved by assisting the output of the engine with the electric motor during vehicle running with the engine or by driving the vehicle with the electric motor while the engine is stopped. Since the electric motor is disposed on the second axial center parallel to the axial center of the hydraulic power transmission device, for example, as compared to the case that the electric motor is disposed concentrically with the hydraulic power transmission device and disposed on the outer circumferential side of the hydraulic power transmission device, a degree of freedom of arrangement of the engine intermittent clutch and the lockup clutch is increased in the outer shell cover of the hydraulic power transmission device, and the distance occupied by the clutches can be made smaller in the axial center direction in the outer shell cover. Therefore, the length of the outer shell cover of the hydraulic power transmission device can be made shorter in the axial center direction, and as a result, the entire axial length of the vehicle power transmission device can be made shorter.

Preferably, the lockup clutch is a friction engagement clutch including a disk-shaped piston member coupled in a power transmittable manner to the output-side rotating member and disposed in a manner allowing movement toward and away from a side wall surface of the input-side rotating member, and a friction plate fixedly disposed on the side wall surface of the input-side rotating member or a surface of the piston member opposite to the side wall surface, such that torque is transmitted between the input-side rotating member and the piston member by frictionally engaging the input-side rotating member and the piston member via the friction plate. Consequently, since it is not necessary to dispose an input member of the one of the clutches separately from the input-side rotating member and it is not necessary to provide an output member of the one of the clutches separately from the piston member, the parts count of the one of the clutches may be reduced. Thus, since the distance occupied by the one of the clutches can be made smaller in the axial center direction in the outer shell cover of the hydraulic power transmission device, the length of the outer shell cover can be made shorter in the axial center direction. As a result, the entire axial length of the vehicle power transmission device can be made shorter.

Preferably, the vehicle power transmission device comprises an electric motor disposed on a second axial center parallel to an axial center of the hydraulic power transmission device and operatively coupled to the input-side rotating member. Consequently, for example, vehicle fuel efficiency can be improved by assisting the output of the engine with the electric motor during vehicle running with the engine or by driving the vehicle with the electric motor while the engine is stopped. Since the electric motor is disposed on the second axial center parallel to the axial center of the hydraulic power transmission device, for example, as compared to the case that the electric motor is disposed concentrically with the hydraulic power transmission device and disposed on the outer circumferential side of the hydraulic power transmission device, a degree of freedom of arrangement of the engine intermittent clutch and the lockup clutch is increased in the outer shell cover of the hydraulic power transmission device, and the distance occupied by the clutches can be made smaller in the axial center direction in the outer shell cover. Therefore, the length of the outer shell cover of the hydraulic power transmission device can be made shorter in the axial center direction, and as a result, the entire axial length of the vehicle power transmission device can be made shorter.

Preferably, the engine intermittent clutch and the lockup clutch are disposed to partially or entirely overlap with each other when viewed in a direction orthogonal to the axial center of the hydraulic power transmission device. Since this reduces the distance occupied by the clutches in the axial center direction in the outer shell cover of the hydraulic power transmission device as compared to the case that the engine intermittent clutch and the lockup clutch are not overlapped with each other when viewed in the direction orthogonal to the axial center, the length of the outer shell cover can be made shorter in the axial center direction. As a result, the entire axial length of the vehicle power transmission device can be made shorter.

Preferably, one of the engine intermittent clutch and the lockup clutch is a single plate clutch disposed on an outer circumferential side of the other clutch, and the other clutch is a multiplate clutch disposed on an inner circumferential side of the one of the clutches. Consequently, the friction surface of the one of the clutches is made relatively larger by disposing the one of the clutches consisting of a single plate clutch, in which it is difficult to ensure a torque capacity as compared to the other clutch consisting of a multiplate clutch, on the outer circumferential side of the other clutch, and an upper limit of the torque capacity of the one of the clutches and an upper limit of the torque capacity of the other clutch can be set equal to each other. Since the engine intermittent clutch and the lockup clutch may be put into the engaged state, i.e., the power transmission state, at the same time to be arranged in series in the power transmission path from the engine to the power transmission mechanism, it is desirable to set the upper limits of the torque capacities of the clutches equal to each other.

Preferably, the engine intermittent clutch is a multiplate clutch, and the lockup clutch is a single plate clutch. Consequently, the friction surface of the lockup clutch is made relatively larger by disposing the lockup clutch consisting of a single plate clutch, in which it is difficult to ensure a torque capacity as compared to the engine intermittent clutch consisting of a multiplate clutch, on the outer circumferential side of the engine intermittent clutch, and the upper limit of the torque capacity of the engine intermittent clutch and the upper limit of the torque capacity of the lockup clutch can be set equal to each other.

Preferably, the second damper is disposed on an outer circumferential side of the first damper. This enables a longer stroke of the second damper and, for example, the effect of suppressing noise and vibration such as booming noise in a vehicle can be enhanced in the second damper. Since the first damper is disposed on the inner circumferential side of the second damper, it becomes easier to ensure the strength of the input member of the first damper subjected to engine explosion fluctuations.

In this description, a multiplate clutch is a clutch of the type in which torque is transmitted via a plurality of friction plates consisting of one or a plurality of input-side friction plates engaged with or fixed to an input member of the multiplate clutch in a torque transmittable manner and one or a plurality of output-side friction plates engaged with or fixed to an output member of the multiplate clutch in a torque transmittable manner. A single plate clutch is a clutch of the type in which torque is transmitted via one friction plate interposed between an input member and an output member of the single plate clutch. Even if a plurality of friction members is circumferentially disposed on the same plane, the friction plate is considered as one friction plate.

BEST MODE FOR CARRYING OUT THE INVENTION

An embodiment of the present invention will now be described in detail with reference to the drawings. The figures are simplified or deformed as needed in the following embodiment and portions are not necessarily precisely depicted in terms of dimension ratio, shape, etc.

First Embodiment

Figure 1:
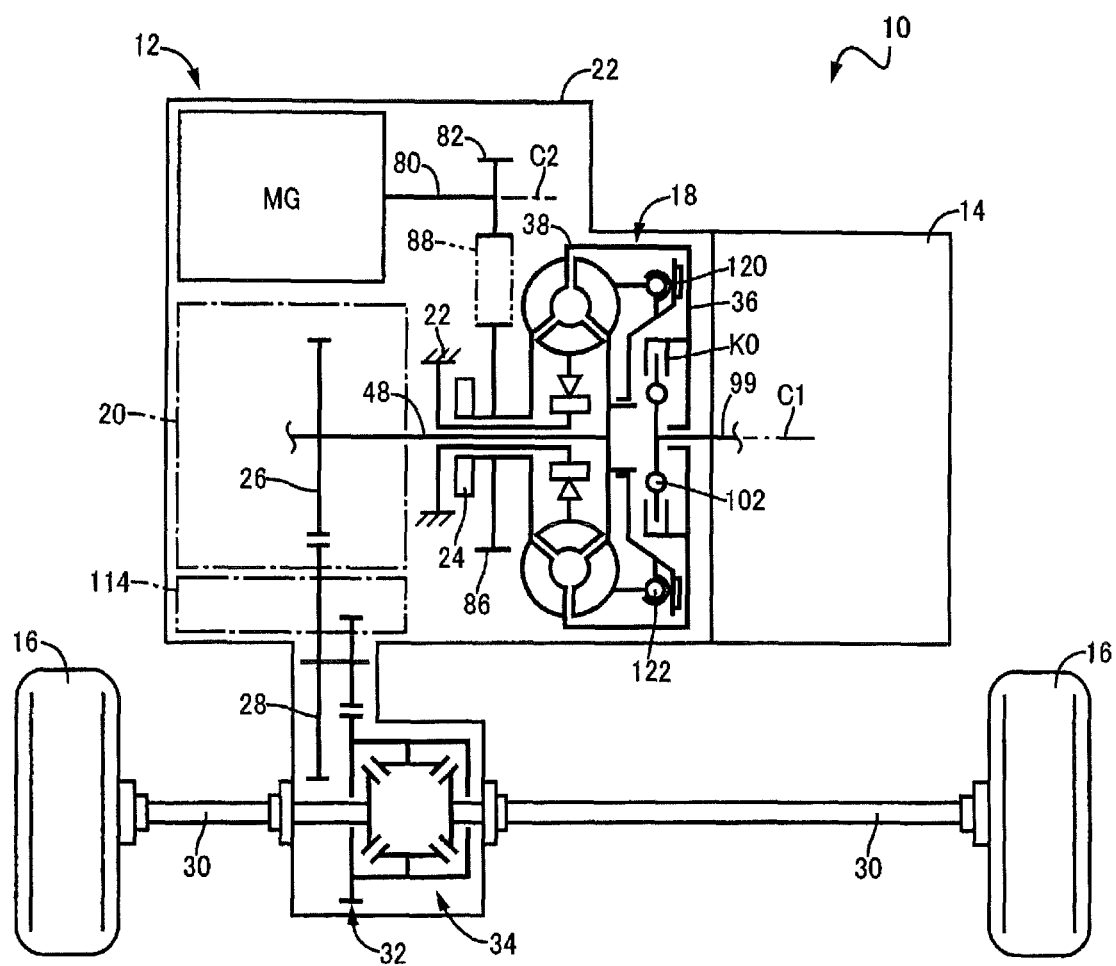
FIG. 1 is a diagram of a power transmission path in a vehicle including a vehicle power transmission device of an embodiment of the present invention, from an engine acting as a drive power source of the vehicle via the power transmission device to drive wheels.
Figure 2:
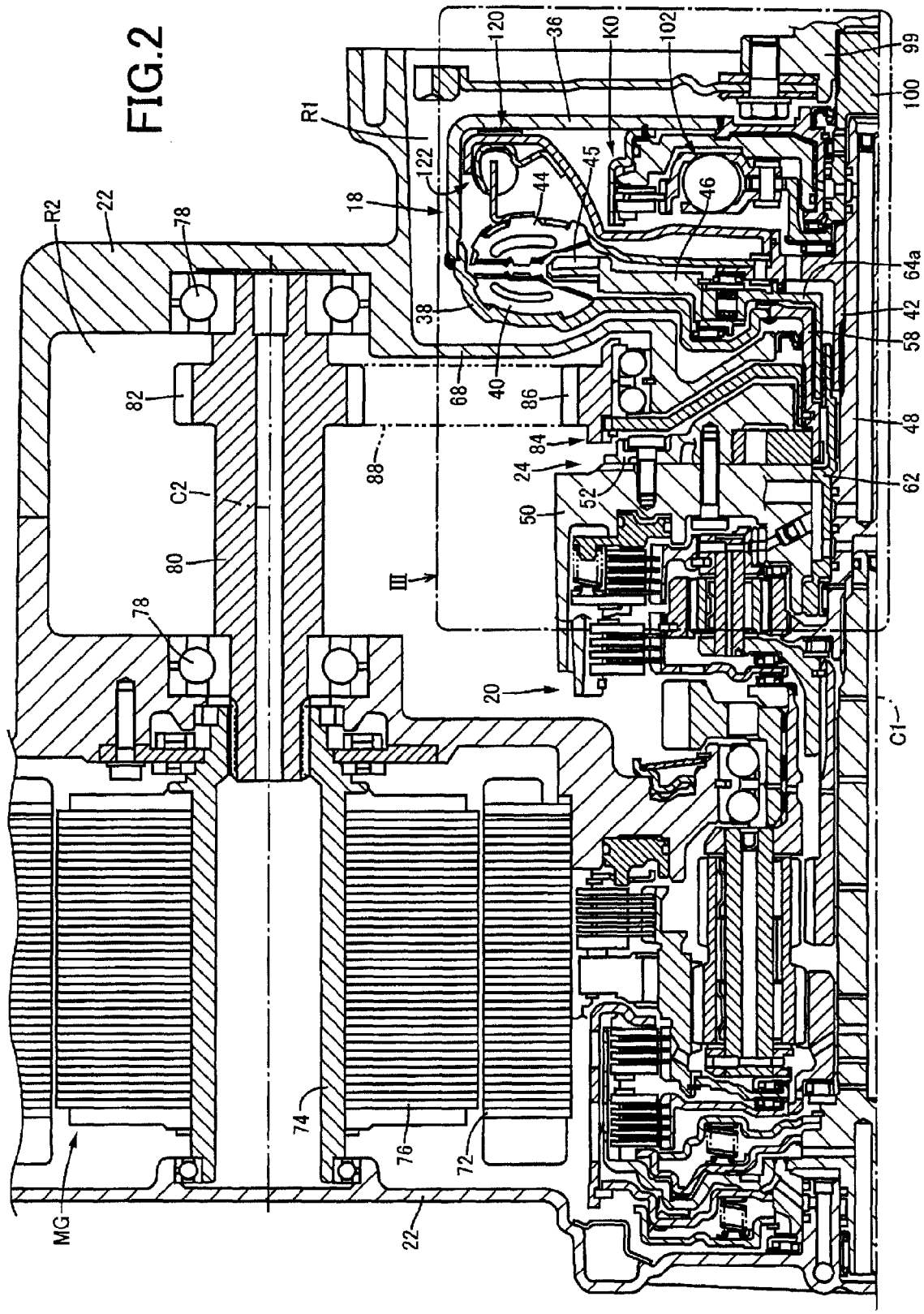
FIG. 2 is a cross-sectional view of a main portion of the power transmission device of FIG. 1.

FIG. 1 is a diagram of a power transmission path in a vehicle 10 including a vehicle power transmission device 12 (hereinafter referred to as a "power transmission device 12") of an embodiment of the present invention, from an engine 14 acting as a drive power source of the vehicle 10 via the power transmission device 12 to drive wheels 16. FIG. 2 is a cross-sectional view of a main portion of the power transmission device 12, i.e., a torque converter 18, an automatic transmission 20, an electric motor MG, etc. A first axial center C1 is an axial center of the torque converter 18, the automatic transmission 20, etc. In FIG. 2, a lower half from the first axial center C1 is not depicted.

As depicted in FIG. 1, the power transmission device 12 has a transaxle case (case) 22 attached to a vehicle body by bolts etc., and includes the torque converter 18, an oil pump 24, and the automatic transmission 20 disposed in the power transmission path between the engine 14 and the drive wheels 16 and arranged on the first axial center C1 in this order in series from the engine 14 side in the transaxle case 22. The power transmission device 12 also includes the electric motor MG disposed on a second axial center C2 parallel to the first axial center C1 and coupled to an input-side rotating member (a rear cover 38 described later) of the torque converter 18 in a power transmittable manner. The second axial center C2 corresponds to a second axial center parallel to the axial center of the torque converter 18.

In the transaxle case 22, the power transmission device 12 includes a counter driven gear 28 disposed integrally with a rotation shaft parallel to the first axial center C1 and engaged with an output gear 26 that is an output member of the automatic transmission 20, a final gear pair 32 disposed between the rotation shaft parallel to the first axial center C1 and a pair of axles 30, and a differential gear device 34 transmitting the power from a driven gear of the final gear pair 32 to each of a pair of the axles 30.

The power transmission device 12 configured as described above is transversely mounted along with the engine 14 on the front side of the front-wheel drive, i.e., FF (front-engine front-drive) type vehicle 10, for example. The vehicle 10 is driven by at least one of the engine 14 and the electric motor MG. For driving the vehicle 10, the power from the engine 14 and the electric motor MG is transmitted sequentially through the torque converter 18, the automatic transmission 20, the counter driven gear 28, the final gear pair 32, the differential gear device 34, and a pair of the axles 30 to each of a pair of the drive wheels 16.

The devices included in the power transmission device 12 will hereinafter be described in detail with reference to FIGS. 2 to 5.

The automatic transmission 20 is a well-known stepped transmission and corresponds to a power transmission mechanism of the present invention disposed on the opposite side to the engine 14 relative to the torque converter 18 in the first axial center C1 direction to transmit power input from the torque converter 18 to the subsequent stage.

The torque converter 18 is a hydraulic power transmission device making up a portion of the power transmission path between the engine 14 and the drive wheels 16. As depicted in FIG. 2, the torque converter 18 includes a front cover 36 and the rear cover 38 disposed on the first axial center C1 in this order from the engine 14 side and integrally coupled to each other to be rotatable around the first axial center C1. The front cover 36 is a bottomed cylindrical member opened toward the automatic transmission 20 and the rear cover 38 is a disk-shaped member having an outer circumferential end portion curved toward the engine 14, i.e., toward the front cover 36, and fixed to an opening end portion of the front cover 36 by welding, for example.

The front cover 36 and the rear cover 38 are allowed to function as an input-side rotating member rotated by input of the power from the engine 14 via an engine intermittent clutch K0. A plurality of circumferentially arranged pump blades 40 is fixedly disposed on the inside of the rear cover 38.

The torque converter 18 includes a turbine 42 disposed with a plurality of turbine blades 44 opposite to the pump blades 40 on the rear cover 38 side of the pump blades 40 and circumferentially arranged on an outer circumferential portion of a disk portion 42c coupled by rivets to an outer circumferential portion of a flange portion 42b to receive a fluid flow from the pump blades 40, and a stator 46 disposed with stator blade 45 disposed between the pump blades 40 and the turbine blades 44. The turbine 42 is allowed to function as an output-side rotating member of the torque converter 18 and relatively non-rotatably coupled by spline fitting to an outer circumferential surface of an input shaft 48 of the automatic transmission 20.

The front cover 36 and the rear cover 38 have a function of an outer shell cover of the torque converter 18 housing the pump blades 40, the turbine blades 44, the turbine 42, the stator blade 45, the stator 46, and the fluid flowing from the pump blades 40 to the turbine blades 44.

Figure 3:
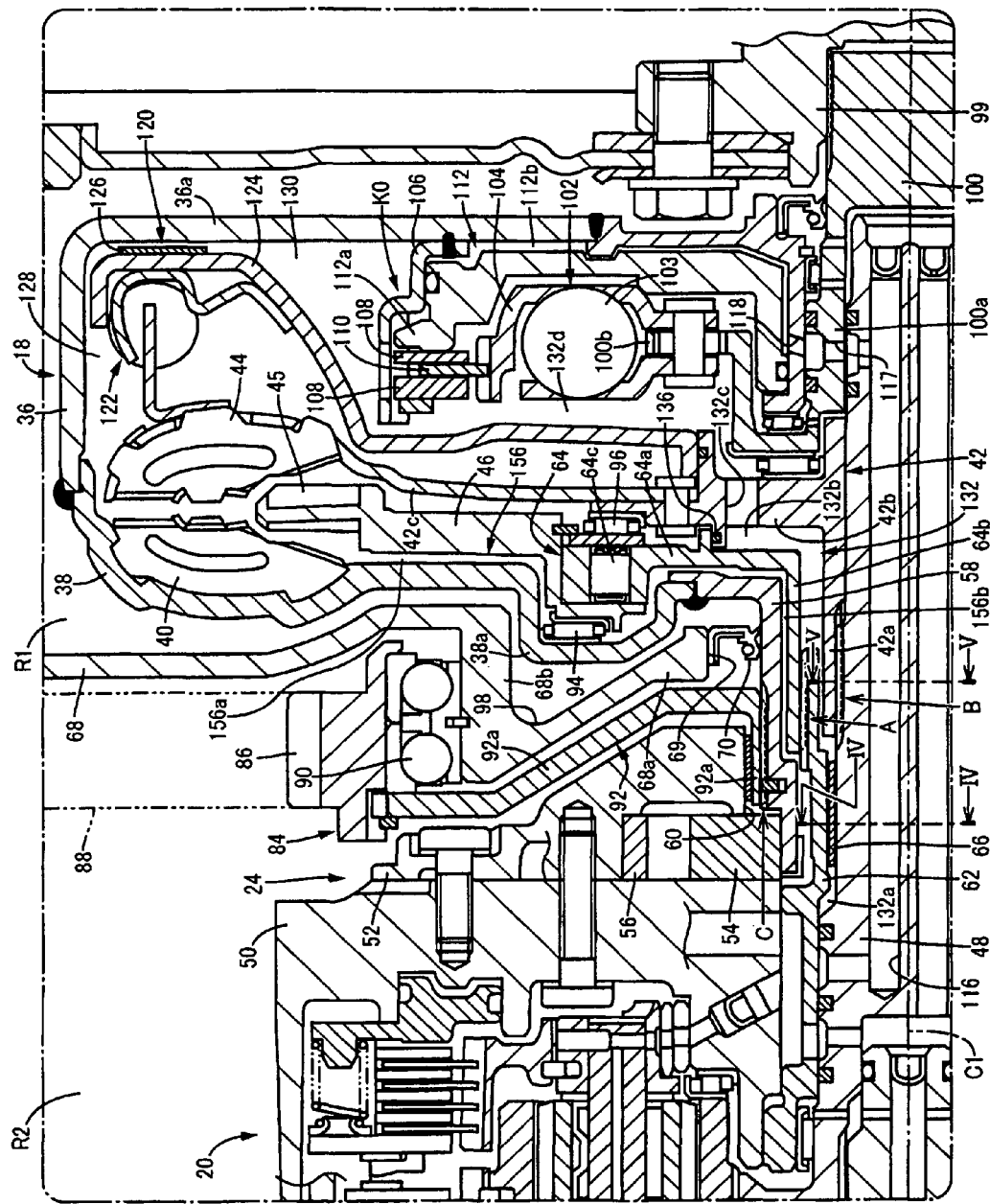
FIG. 3 is an enlarged diagram of a portion indicated by an arrow III surrounded by a dashed-dotted line of FIG. 2.

FIG. 3 is an enlarged diagram of a portion indicated by an arrow III surrounded by a dashed-dotted line of FIG. 2. As depicted in FIG. 3, the well-known internal gear oil pump 24 is disposed between the torque converter 18 and the automatic transmission 20. The oil pump 24 includes a pump cover 50 as a non-rotating member fixed to the transaxle case 22, a pump body 52 disposed on the rear cover 38 side of the pump cover 50 and integrally fixed to the pump cover 50, and an internal gear pair, i.e., a drive gear 54 and a driven gear 56, engaged with each other and rotatably housed in a pump chamber formed by the pump cover 50 and the pump body 52.

The oil pump 24 configured as described above is rotationally driven by a tubular pump drive shaft 58 concentric with the input shaft 48 and larger in diameter than the input shaft 48 and projected from the rear cover 38 toward the automatic transmission 20. The tubular pump drive shaft 58 is inserted through a through-hole 60 formed in the pump body 52 and relatively non-rotatably coupled to the drive gear 54.

On the inner circumferential side of the pump cover 50, a tubular stator shaft 62, i.e., a non-rotating member concentric with the input shaft 48 and having a diameter larger than the input shaft 48 and smaller than the tubular pump drive shaft 58, is relatively non-rotatably coupled to the pump cover 50.

The stator 46 of the torque converter 18 is coupled via a one way clutch 64 and a tubular coupling shaft 64b projected in the first axial center C1 direction from an inner circumferential edge portion of a disk-shaped inner race 64a of the one way clutch 64 to the stator shaft 62 that is the non-rotating member. The tubular coupling shaft 64b is a cylindrical member having a diameter larger than the input shaft 48 and the stator shaft 62 and smaller than the tubular pump drive shaft 58. The one way clutch 64 includes a sprag 64c having a predetermined dimension in the first axial center C1 direction larger than the thicknesses of the stator 46 and the inner race 64a so as to have a sufficient torque capacity for inhibiting inverse rotation of the stator 46 at the time of torque amplification of the torque converter 18. Therefore, the one way clutch 64 is disposed protruding toward the automatic transmission 18 as compared to the stator 46 and the inner race 64a.

As indicated by an arrow A in FIG. 3, a leading end portion of the tubular coupling shaft 64b projected from the inner circumferential edge portion of the inner race 64a is relatively non-rotatably coupled by spline fitting to an end portion of the stator shaft 62 at a position closer to the automatic transmission 20 than the pump blades 40 in a direction orthogonal to the first axial center C1, i.e., outside the outer shell cover of the torque converter 18.

A coupling portion (spline fitting portion) of the tubular coupling shaft 64b to the stator shaft 62 is disposed to partially overlap with the pump body 52 of the oil pump 24 when viewed in a direction orthogonal to the first axial center C1. The pump body 52 of the oil pump 24 is a member disposed at a position closer to the automatic transmission 20 than the pump blades 40 in the first axial center C1 direction, i.e., at a position closer to the automatic transmission 20 than the outer shell cover of the torque converter 18.

The input shaft 48 of the automatic transmission 20 is rotatably supported via a bush (bearing member) 66 by the stator shaft 62 on the inner circumferential side of the stator shaft 62.

The turbine 42 of the torque converter 18 has a cylindrical boss portion 42a relatively non-rotatably coupled by spline fitting to an outer circumferential portion of the input shaft 48 of the automatic transmission 20, a flange portion 42b projected radially outward from a portion of an outer circumferential surface of the boss portion 42a on the engine 14 side of the inner race 64a of the one way clutch 64, and a disk portion 42c riveted to an outer circumferential portion of the flange portion 42b. As indicated by an arrow B in FIG. 3, the boss portion 42a is relatively non-rotatably fitted and coupled to the input shaft 48 at a position closer to the automatic transmission 20 than the pump blades 40 in the first axial center C1 direction, i.e., at a position closer to the automatic transmission 20 than the outer shell cover of the torque converter 18.

The boss portion 42a of the turbine 42 is coupled to the input shaft 48 at a position closer to the automatic transmission 20 than a position in the rear cover 38 at which the pump blades 40 are fixed in the first axial center C1 direction.

The stator shaft 62 is relatively non-rotatably fitted and coupled to the tubular coupling shaft 64b of the one way clutch 64 at a position partially overlapping with a coupling portion of the turbine 42 to the input shaft 48 when viewed in the first axial center C1 direction.

The coupling portion of the turbine 42 to the input shaft 48 is disposed to partially overlap with the pump body 52 of the oil pump 24 when viewed in a direction orthogonal to the first axial center C1.

The bush 66 is disposed at a position closer to the automatic transmission 20 than the coupling position of the turbine 42 to the input shaft 48 in the first axial center C1 direction, i.e., at a position closer to the automatic transmission 20 than the outer shell cover of the torque converter 18, so as to partially overlap with the pump body 52 and the drive gear 54 of the oil pump 24 when viewed in the direction orthogonal to the first axial center C1.

The transaxle case 22 has a first chamber R1 housing the torque converter 18 etc., and a second chamber R2 housing the automatic transmission 20, the electric motor MG, the oil pump 24, etc. The first chamber R1 and the second chamber R2 are separated by a bulkhead 68 disposed between the rear cover 38 of the torque converter 18 and the pump body 52 of the oil pump 24 on the outer circumferential side of the tubular pump drive shaft 58 and are oil-tightly sealed from each other by an oil seal 70 oil-tightly sealing a gap between an inner circumferential surface of a through-hole 69 formed in the bulkhead 68 to allow insertion of the tubular pump drive shaft 58 and an outer circumferential surface of the tubular pump drive shaft 58.

A side surface of the pump body 52 closer to the rear cover 38 is inclined radially outward in a tapered shape toward the pump cover 50, i.e., away from the rear cover 38. An inner circumferential portion 68a of the bulkhead 68 is inclined radially outward toward the pump body 52, i.e., away from the rear cover 38 as is the case with the side surface of the pump body 52.

The bulkhead 68 and the oil seal 70 are members disposed at positions closer to the automatic transmission 20 than the pump blades 40 in the first axial center C1 direction, i.e., at positions closer to the automatic transmission 20 than the outer shell cover of the torque converter 18. The coupling portion of the turbine 42 to the input shaft 48 is disposed to partially overlap with the oil seal 70 and the bulkhead 68 when viewed in the direction orthogonal to the first axial center C1.

The electric motor MG is a so-called motor generator having a motor function and an electric generation function. As depicted in FIG. 2, the electric motor MG includes an electric motor stator 72 fixed to an inner wall surface of the transaxle case 22 by bolts, for example; an electric motor output shaft 74 disposed rotatably around the second axial center C2 parallel to the first axial center C1 on the inner circumferential side of the electric motor stator 72; and an electric motor rotor 76 fixedly disposed on an outer circumferential portion of the electric motor output shaft 74 on the inner circumferential side of the electric motor stator 72.

The electric motor output shaft 74 is relatively non-rotatably coupled, for example, by spline fitting, via a pair of first bearings 78 to a power transmission rotation shaft 80 supported rotatably around the second axial center C2 by the transaxle case 22. The power transmission rotation shaft 80 is coupled in a power transmittable manner to an electric motor coupling rotating member 84 via an endless annular transmission chain 88 wrapped around a first electric motor coupling gear 82 disposed integrally with an outer circumferential portion of the power transmission rotation shaft 80 and a second electric motor coupling gear 86 included in an outer circumferential portion of the electric motor coupling rotating member 84 coupled to the tubular pump drive shaft 58. The first electric motor coupling gear 82 and the second electric motor coupling gear 86 are gears for transmitting the power from the electric motor MG to the tubular pump drive shaft 58. The electric motor MG is operatively coupled sequentially through the power transmission rotation shaft 80, the transmission chain 88, the electric motor coupling rotating member 84, and the tubular pump drive shaft 58 to the rear cover 38 that is the input-side rotating member of the torque converter 18.

As depicted in FIG. 3, the second electric motor coupling gear 86 is disposed at a position closer to the automatic transmission 20 than the pump blades 40 in the first axial center C1 direction, i.e., at a position closer to the automatic transmission 20 than the outer shell cover of the torque converter 18. The coupling portion of the turbine 42 to the input shaft 48 is disposed to partially overlap with the second electric motor coupling gear 86 when viewed in the direction orthogonal to the first axial center C1.

The electric motor coupling rotating member 84 includes the second electric motor coupling gear 86 supported rotatably around the first axial center C1 via a second bearing 90 by a supporting portion 68b formed in a radially intermediate portion of the bulkhead 68, and a flange-shaped coupling member 92 coupling the second electric motor coupling gear 86 and the tubular pump drive shaft 58. The supporting portion 68b of the bulkhead 68 is formed by projecting a portion of the bulkhead 68 at a radial position located on the outer circumferential side of the inner circumferential portion 68a toward the second chamber R2 over the entire circumference. The electric motor coupling rotating member 84 has an inner circumferential surface of the second electric motor coupling gear 86 rotatably supported via the second bearing 90 by the supporting portion 68b of the bulkhead 68.

The second bearing 90 and the supporting portion 68b are disposed at positions closer to the automatic transmission 20 than the pump blades 40 in the first axial center C1 direction, i.e., at positions closer to the automatic transmission 20 than the outer shell cover of the torque converter 18. The coupling portion of the turbine 42 to the input shaft 48 is disposed to partially overlap with the second bearing 90 and the supporting portion 68b of the bulkhead 68 when viewed in the direction orthogonal to the first axial center C1.

As indicated by an arrow C in FIG. 3, the coupling member 92 of the electric motor coupling rotating member 84 has a cylindrical boss portion 92a relatively non-rotatably coupled by spline fitting to an outer circumferential portion of the tubular pump drive shaft 58 on the inner circumferential side of the through-hole 60 of the pump body 52. The coupling member 92 has a flange portion 92b that is projected radially outward from one end portion of the boss portion 92a closer to the bulkhead 68, that is inclined radially outward toward the pump body 52, i.e., away from the rear cover 38 as is the case with the side surface of the pump body 52 and the bulkhead 68 disposed adjacently in the first axial center C1 direction, and that is coupled by spline fitting at an outer circumferential end portion to the second electric motor coupling gear 86. The coupling portion of the turbine 42 to the input shaft 48 is disposed to partially overlap with a coupling portion (spline fitting portion) of the coupling member 92 to the tubular pump drive shaft 58 when viewed in the direction orthogonal to the first axial center C1.

A first thrust bearing 94 is disposed between a side wall portion of the rear cover 38 closer to the bulkhead 68 and the stator 46, and the rear cover 38 and the stator 46 are disposed rotatably relative to each other via the first thrust bearing 94. A second thrust bearing 96 is interposed between the stator 46 and the flange portion 42b of the turbine 42, and the stator 46 and the turbine 42 are disposed rotatably relative to each other via the second thrust bearing 96.

An annular groove 98 is formed on the inner circumferential side of the supporting portion 68b of the bulkhead 68. The rear cover 38 has an annular projecting portion 38a formed by projecting a radial portion corresponding to the first thrust bearing 94 in the side wall portion of the rear cover 38 closer to the bulkhead 68 toward the inner circumferential portion 68a of the bulkhead 68, i.e., toward the annular groove 98 over the entire circumference. The annular projecting portion 38a is positioned in the annular groove 98 on the inner circumferential side of the supporting portion 68b of the bulkhead 68. The first thrust bearing 94 and a portion of the one way clutch 64 projected from the stator 46 and the inner race 64a are housed inside the annular projecting portion 38a. Therefore, the one way clutch 64 is disposed protruding toward the automatic transmission 18 as compared to the stator 46 and the inner race 64a. The first thrust bearing 94 is disposed to partially overlap with each of the inner circumferential portion 68a and the supporting portion 68b of the bulkhead 68 and the oil seal 70 when viewed in the direction orthogonal to the first axial center C1. The coupling portion of the turbine 42 to the input shaft 48 and the coupling portion of the tubular coupling shaft 64b to the stator shaft 62 are disposed to partially overlap with each of the first thrust bearing 94 and the oil seal 70 when viewed in the direction orthogonal to the first axial center C1.

An output end portion of a crankshaft 99, i.e., an output shaft of the engine 14, is coupled to an engine coupling shaft 100 by spline fitting, for example. The engine coupling shaft 100 is disposed concentrically with the input shaft 48 and a leading end portion of the input shaft 48 of the automatic transmission 20 is relatively rotatably fit into a fitting hole formed on the inner circumferential side of a cylindrical shaft end portion 100a of the engine coupling shaft 100 on the opposite side to the crankshaft 99 and is rotatably supported by the cylindrical shaft end portion 100a.

The engine coupling shaft 100 has a flange portion 100b projected radially outward from the cylindrical shaft end portion 100a. The flange portion 100b is disposed with a first damper 102 inserted in a power transmission path between the crankshaft 99 of the engine 14 and the front cover 36 of the torque converter 18. The first damper 102 includes a damper elastic member 103 made of a spring, rubber, etc., interposed between the input/output members and is a shock absorber causing torsion between the input/output members depending on transmission torque to absorb impact and pulsation. Engine torque is transmitted to the torque converter 18 with pulsation thereof suppressed by the first damper 102. The first damper 102 is a damper inserted in the power transmission path between the engine 14 and the electric motor MG.

The torque converter 18 includes the engine intermittent clutch K0 selectively coupling the crankshaft 99 of the engine 14 and the front cover 36 of the torque converter 18 such that the engine intermittent clutch K0 is disposed closer to the engine 14 relative to the turbine 42 and housed in the front cover 36.

The engine intermittent clutch K0 is a wet multiplate clutch including a clutch hub 104 coupled via the first damper 102 to the crankshaft 99 and also acting as an output member of the first damper 102, a cylindrical clutch drum 106 integrally fixed to the front cover 36 of the torque converter 18 on the outer circumferential side of the clutch hub 104, a pair of first friction plates 108 arranged in a gap between the clutch hub 104 and the clutch drum 106 to overlap with each other when viewed in a direction parallel to the first axial center C1 and each relatively non-rotatably engaged with the clutch drum 106, a second friction plate 110 disposed between a pair of the friction plates 108 and relatively non-rotatably engaged with the clutch hub 104, and a hydraulic actuator 112 pressing the first friction plates 108 and the second friction plate 110 in an overlapping direction thereof, i.e., in a direction parallel to the first axial center C1, to frictionally engage the first friction plates 108 and the second friction plates 110 with each other so that the clutch hub 104 and the clutch drum 106 are coupled to each other. The engine intermittent clutch K0 transmits torque through a friction surface between one of a pair of the first friction plates 108 and the second friction plate 110 and a friction surface between the other of a pair of the first friction plates 108 and the second friction plate 110. In other words, the engine intermittent clutch K0 couples the clutch hub 104 and the clutch drum 106 to each other via the two friction surfaces. The engine intermittent clutch K0 is located on the inner circumferential side of a lockup clutch 120 described later and is disposed to partially overlap with the lockup clutch 120 when viewed in the direction orthogonal to the first axial center C1.

The hydraulic actuator 112 has a piston 112a disposed closer to a side wall portion 36a of the front cover 36 relative to the first friction plates 108 and the second friction plate 110, and a pressure chamber 112b formed by being surrounded by the piston 112a, the front cover 36, and the clutch drum 106. The pressure chamber 112b is supplied with operating oil from a hydraulic control circuit 114 through a first oil passage 116 formed within the input shaft 48 of the automatic transmission 20 in the first axial center C1 direction in communication with the hydraulic control circuit 114 (see FIG. 1) outputting the operating oil with a pressure adjusted by using an oil pressure generated by the oil pump 24 as an original pressure, a second oil passage 117 formed in the cylindrical shaft end portion 100a of the engine coupling shaft 100 in communication with the first oil passage 116, and a third oil passage 118 formed in the front cover 36 in communication with the second oil passage 117.

The engine intermittent clutch K0 is subjected to engagement/release control by the hydraulic control circuit 114. In the engagement/release control, a power-transmittable torque capacity of the engine intermittent clutch K0, i.e., an engagement force of the engine intermittent clutch K0 is varied, for example, continuously, through pressure adjustment of a linear solenoid valve etc., in the hydraulic control circuit 114. In the engaged state of the engine intermittent clutch K0, the front cover 36 acting as the input-side rotating member of the torque converter 18 is integrally rotated with the crankshaft 99 of the engine 14. Therefore, in the engaged state of the engine intermittent clutch K0, the power from the engine 14 is input via the first damper 102 to the front cover 36 of the torque converter 18. On the other hand, in the released state of the engine intermittent clutch K0, power transmission is interrupted between the front cover 36 of the torque converter 18 and the engine 14.

The torque converter 18 includes the lockup clutch 120 selectively coupling the front cover 36 that is the input-side rotating member of the torque converter 18 and the turbine 42 that is the output-side rotating member such that the lockup clutch 120 is disposed closer to the engine 14 relative to the turbine 42 and housed in the front cover 36.

The lockup clutch 120 is a friction engagement clutch including a disk-shaped lockup clutch piston (piston member) 124 that is coupled in a power transmittable manner to the disk portion 42c of the turbine 42 via a second damper 122 configured as a shock absorber as is the case with the first damper 102 and that is disposed in a manner allowing movement toward and away from the side wall surface of the front cover 36 so as to act as an output member of the lockup clutch 120, a lockup clutch friction plate 126 fixedly attached to a surface of the lockup clutch piston 124 opposite to the front cover 36, an engagement-side oil chamber 128 having an inner pressure increased to press the lockup clutch piston 124 toward the front cover 36 when the lockup clutch 120 is engaged, and a release-side oil chamber 130 having an inner pressure increased to press the lockup clutch piston 124 away from the front cover 36 when the lockup clutch 120 is released, such that torque is transmitted between the front cover 36 and the lockup clutch piston 124 by the friction engagement between the front cover 36 and the lockup clutch piston 124 via the lockup clutch friction plate 126. The lockup clutch 120 transmits torque via a friction surface between the lockup clutch friction plate 126 and the front cover 36. In other words, the lockup clutch 120 couples the front cover 36 and the lockup clutch piston 124 to each other via the one friction surface.

The engagement-side oil chamber 128 is formed by being surrounded by the lockup clutch piston 124, the front cover 36, the turbine blades 44, etc. The release-side oil chamber 130 is formed by being surrounded by the lockup clutch piston 124, the front cover 36, the clutch drum 106, etc. The lockup clutch 120 is a single plate clutch having a hydraulic actuator using an engine-side wall portion of the front cover 36 that is the input-side rotating member, i.e., the side wall portion 36a closer to the engine 14, as a portion of the members forming the release-side oil chamber 130, and is disposed on the outer circumferential side of the engine intermittent clutch K0.

The second damper 122 is a damper inserted in the power transmission path between the front cover 36 that is the input-side rotating member of the torque converter 18 and the turbine 42 that is the output-side rotating member and inserted in the power transmission path between the electric motor MG and the automatic transmission 20. The second damper 122 is disposed on the outer circumferential side of the first damper 102, partially overlapping with the first damper 102 when viewed in the direction orthogonal to the first axial center C1.

The release-side oil chamber 130 has both a function as an oil pressure chamber of the hydraulic actuator of the lockup clutch 120 and a function as a portion of a release-side flow passage 132 through which the operating oil flows at the time of release of the lockup clutch 120, in a circulation flow passage allowing circulation of the operating oil (fluid) between the torque converter 18 and the hydraulic control circuit 114 supplying the operating oil into the torque converter 18.

The release-side flow passage 132 is made up of a cylindrical gap 132a formed between the input shaft 48 of the automatic transmission 20 and each of the stator shaft 62 and the inner race 64a in communication with the hydraulic control circuit 114 outputting the operating oil with a pressure adjusted by using an oil pressure generated by the oil pump 24 as an original pressure, an annular gap 132b formed between a side wall portion of the inner race 64a and the flange portion 42b of the turbine 42 in communication with the annular gap 132a, a through-hole 132c penetrating the flange portion 42b of the turbine 42 in a direction parallel to the first axial center C1 in communication with the annular gap 132b, an annular gap 132d formed on the first damper 102 side of the through-hole 132c between the first damper 102/the engine intermittent clutch K0 and the lockup clutch piston 124, the release-side oil chamber 130, the engagement-side oil chamber 128, etc. The operating oil is supplied to the release-side oil chamber 130 sequentially through the cylindrical gap 132a, the annular gap 132b, the through-hole 132c, and the annular gap 132d. Therefore, the lockup clutch 120 has the release-side oil chamber 130 consisting of a portion of the release-side flow passage 132 and having an inner pressure increased by supply of the operating oil when the lockup clutch 120 is released. The cylindrical gap 132a of the release-side flow passage 132 is in communication with the hydraulic control circuit 114 through an oil passage not depicted formed in the stator shaft 62. The release-side flow passage 132 has a function as a circulation outward passage through which the fluid is flowed from the hydraulic control circuit 114 toward the inside of the torque converter 18 at the time of circulation, in the circulation flow passage allowing a large amount of the operating oil to be circulated by release of the lockup clutch 120 between the torque converter 18 and the hydraulic control circuit 114 supplying the operating oil into the torque converter 18.

Figure 4:
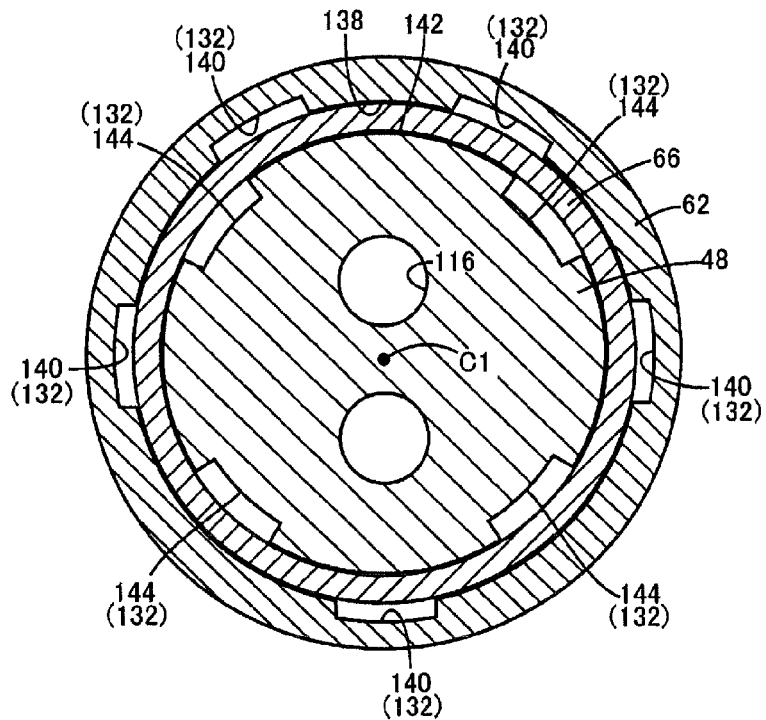
FIG. 4 is a cross-sectional view of a cross section taken along line IV-IV of FIG. 3.

In the cylindrical gap 132a, the bush 66 acting as a bearing member or a metal bearing is disposed between the input shaft 48 and the stator shaft 62. FIG. 4 is a cross-sectional view of a cross section taken along line IV-IV of FIG. 3. As depicted in FIG. 4, a plurality of (in this embodiment, five) first axial grooves 140 is circumferentially formed in a first cylindrical inner circumferential surface 138 of the stator shaft 62 opposite to an outer circumferential surface of the bush 66. A plurality of (in this embodiment, four) second axial grooves 144 is circumferentially formed in a first cylindrical outer circumferential surface 142 of the input shaft 48 opposite to an inner circumferential surface of the bush 66. The first axial grooves 140 and the second axial grooves 144 act as flow passages making up a portion of the release-side flow passage 132. The provision of the first axial grooves 140 and the second axial grooves 144 suppresses the reduction in a flow cross-section area of the release-side flow passage 132 due to the provision of the bush 66.

Figure 5:
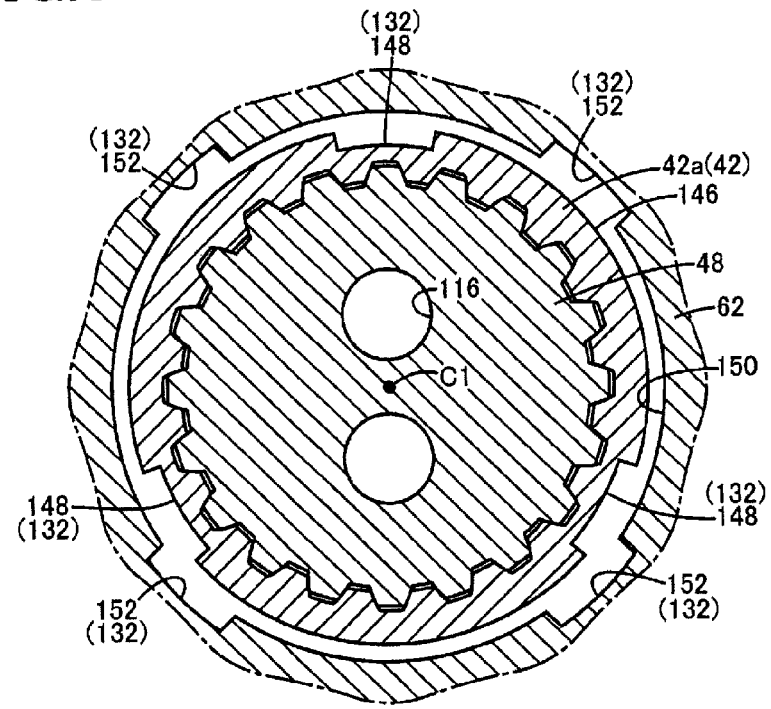
FIG. 5 is a cross-sectional view of a cross section taken along line V-V of FIG. 3.

FIG. 5 is a cross-sectional view of a cross section taken along line V-V of FIG. 3. As depicted in FIG. 5, a plurality of (in this embodiment, three) third axial grooves 148 is circumferentially formed in a second cylindrical outer circumferential surface 146 corresponding to the spline fitting portion of the boss portion 42a to the input shaft 48 in the first axial center C1 direction, in the outer circumferential surface of the boss portion 42a of the turbine 42. A plurality of (in this embodiment, four) fourth axial grooves 152 is circumferentially formed in a second cylindrical inner circumferential surface 150 corresponding to the spline fitting portion (see FIG. 3) of the stator shaft 62 to the inner race 64a in the first axial center C1 direction, in the inner circumferential surface of the stator shaft 62. The third axial grooves 148 and the fourth axial grooves 152 act as flow passages making up a portion of the release-side flow passage 132. The provision of the third axial grooves 148 and the fourth axial grooves 152 suppresses the reduction in a flow cross-section area of the release-side flow passage 132 due to the overlap between the spline fitting portion of the turbine 42 to the input shaft 48 and the spline fitting portion of the stator shaft 62 to the inner race 64a when viewed in the direction orthogonal to the first axial center C1.

As depicted in FIG. 3, a gap formed between the stator 46 and the turbine blades 44 in the release-side flow passage 132 is oil-tightly sealed by a seal member 136 on the inner circumferential side of the stator 46 and the turbine blades 44 and on the outer circumferential side of the annular gap 132b located on the radially outer circumferential side relative to the through-hole 132c. The seal member 136 is disposed between an annular protrusion projected from the side wall portion of the inner race 64a toward the flange portion 42b of the turbine 42 and an annular protrusion projected from the flange portion 42b toward the side wall portion of the inner race 64a on the inner circumferential side of the annular protrusion.

The lockup clutch 120 is subjected to engagement/release control by the hydraulic control circuit 114. In the engagement/release control, a power-transmittable torque capacity of the lockup clutch 120, i.e., an engagement force of the lockup clutch 120 is varied, for example, continuously, through pressure adjustment of a linear solenoid valve etc., in the hydraulic control circuit 114. In the engaged state of the lockup clutch 120, the front cover 36 acting as the input-side rotating member of the torque converter 18 is directly coupled to the turbine 42 acting as the output-side rotating member. Therefore, in the engaged state of the lockup clutch 120, the power from the engine 14 is input to the automatic transmission 18 sequentially through the front cover 36, the second damper 122, the turbine blade 44, and the turbine 42. On the other hand, in the released state of the lockup clutch 120, the power transmitted to the front cover 36 of the torque converter 18 is transmitted through the fluid to the turbine 42.

The torque converter 18 is provided with a portion of an engagement-side flow passage 156 through which the operating oil flows at the time of engagement of the lockup clutch 120. The engagement-side flow passage 156 is made up of an annular gap 156a formed between the rear cover 38 and the stator 46, a cylindrical gap 156b formed between the tubular pump drive shaft 58 and the inner race 64a of the one way clutch 64/the stator shaft 62 in communication with each of the annular gap 156a and the hydraulic control circuit 114, etc. The cylindrical gap 156b of the engagement-side flow passage 156 is in communication with the hydraulic control circuit 114 through an oil passage not depicted formed in the stator shaft 62. The engagement-side flow passage 156 has a function as a circulation return passage through which the fluid is flowed from the inside of the torque converter 18 toward the hydraulic control circuit 114 at the time of circulation, in the circulation flow passage allowing a large amount of the operating oil to be circulated by release of the lockup clutch 120 between the inside of the torque converter 18 and the hydraulic control circuit 114 supplying the operating oil into the torque converter 18.

The vehicle power transmission device 12 of this embodiment is the vehicle power transmission device 12 including the torque converter (hydraulic power transmission device) 18 having the rear cover (input-side rotating member) 38 disposed with a plurality of the pump blades 40 and the turbine (output-side rotating member) 42 disposed with a plurality of the turbine blades 44 receiving a fluid flow from the pump blades 40, and the automatic transmission (power transmission mechanism) 20 transmitting the power input to the input shaft 48 from the torque converter 18 to the subsequent stage, in the power transmission path between the engine 14 and the drive wheels 16; the rear cover 38 has a function of an outer shell cover housing the turbine 42 disposed with the turbine blades 44 opposite to the pump blades 40 and the fluid flowing from the pump blades 40 to the turbine blades 44; the engine intermittent clutch K0 selectively coupling the crankshaft 99 of the engine 14 to the rear cover 38 and the lockup clutch 120 selectively coupling the rear cover 38 to the turbine 42 are disposed closer to the engine 14 relative to the turbine blades 44 in the rear cover 38; and the lockup clutch 120 is a single plate clutch having the hydraulic actuator using the side wall portion of the front cover (input-side rotating member) 36 closer to the engine 14 as a portion of the members forming the oil chamber. Therefore, since the parts count of the lockup clutch 120 may be reduced and the distance occupied by the lockup clutch 120 can be made smaller in the first axial center C1 direction in the outer shell cover of the torque converter 18, the length of the outer shell cover can be made shorter in the first axial center C1 direction. As a result, the entire axial length of the vehicle power transmission device 12 can be made shorter.

According to the vehicle power transmission device 12 of this embodiment, the lockup clutch 120 is a friction engagement clutch including the disk-shaped lockup clutch piston (piston member) 124 coupled in a power transmittable manner to the turbine 42 via the second damper 122 and disposed in a manner allowing movement toward and away from the side wall surface of the front cover 36 so as to act as the output member of the lockup clutch 120, and the lockup clutch friction plate (friction plate) 126 fixedly attached to a surface of the lockup clutch piston 124 opposite to the front cover 36, such that torque is transmitted between the front cover 36 and the lockup clutch piston 124 by frictionally engaging the front cover 36 and the lockup clutch piston 124 via the lockup clutch friction plate 126. Therefore, since it is not necessary to dispose an input member of the lockup clutch 120 separately from the front cover 36 and it is not necessary to provide an output member of the lockup clutch 120 separately from the lockup clutch piston 124, the parts count of the lockup clutch 120 may be reduced. Thus, since the distance occupied by the lockup clutch 120 can be made smaller in the first axial center C1 direction in the outer shell cover of the torque converter, the length of the outer shell cover can be made shorter in the first axial center C1 direction. As a result, the entire axial length of the vehicle power transmission device 12 can be made shorter.

The vehicle power transmission device 12 of this embodiment includes the electric motor MG disposed on the second axial center C2 parallel to the first axial center C1 of the torque converter 18 and coupled to the rear cover 38 in a power transmittable manner. Therefore, for example, vehicle fuel efficiency can be improved by assisting the output of the engine 14 with the electric motor MG during vehicle running with the engine 14 or by driving the vehicle with the electric motor MG while the engine 14 is stopped. Since the electric motor MG is disposed on the second axial center C2 parallel to the first axial center C1 of the torque converter 18, for example, as compared to the case that the electric motor MG is disposed concentrically with the torque converter 18 and disposed on the outer circumferential side of the torque converter 18, a degree of freedom of arrangement of the engine intermittent clutch K0 and the lockup clutch 120 is increased in the outer shell cover of the torque converter 18, and the distance occupied by the clutches K0 and 120 can be made smaller in the first axial center C1 direction in the outer shell cover, resulting in a shorter axial length of the outer shell cover. As a result, the entire axial length of the vehicle power transmission device 12 can be made shorter.

Some conventional power transmission devices have an electric motor disposed on an axial center of a torque converter. In such a power transmission device, the electric motor is disposed on, for example, the outer circumferential side of the torque converter so as to restrain the entire axial length of the power transmission device from increasing. In such a power transmission device, because the electric motor is disposed on the outer circumferential side of the torque converter, a lockup clutch must be reduced in diameter. Therefore, the lockup clutch must be made up of a multiplate clutch so as to ensure a torque capacity of the lockup clutch. Thus, it is problematic that the parts count of the lockup clutch becomes relatively larger and that an axial length of an outer shell cover of the torque converter becomes longer.

According to the vehicle power transmission device 12 of this embodiment, the engine intermittent clutch K0 and the lockup clutch 120 are disposed to partially or entirely overlap with each other when viewed in the direction orthogonal to the first axial center C1. Since this reduces the distance occupied by the clutches K0 and 120 in the first axial center C1 direction in the outer shell cover of the torque converter 18 as compared to the case that the engine intermittent clutch K0 and the lockup clutch 120 are not overlapped with each other when viewed in the direction orthogonal to the first axial center C1, the length of the outer shell cover can be made shorter in the first axial center C1 direction. As a result, the entire axial length of the vehicle power transmission device 12 can be made shorter.

According to the vehicle power transmission device 12 of this embodiment, the lockup clutch 120 is a single plate clutch disposed on the outer circumferential side of the engine intermittent clutch K0 and the engine intermittent clutch K0 is a multiplate clutch disposed on the inner circumferential side of the lockup clutch 120. Therefore, the friction surface of the lockup clutch 120 is made relatively larger by disposing the lockup clutch 120 consisting of a single plate clutch, in which it is difficult to ensure a torque capacity as compared to the engine intermittent clutch K0 consisting of a multiplate clutch, on the outer circumferential side of the engine intermittent clutch K0, and the upper limit of the torque capacity of the engine intermittent clutch K0 and the upper limit of the torque capacity of the lockup clutch 120 can be set equal to each other. Since the engine intermittent clutch K0 and the lockup clutch 120 may be put into the engaged state, i.e., the power transmission state, at the same time to be arranged in series in the power transmission path from the engine 14 to the automatic transmission 20, it is desirable to set the upper limits of the torque capacities of the clutches K0 and 120 equal to each other.

According to the vehicle power transmission device 12 of this embodiment, the torque converter 18 includes the first damper 102 inserted in the power transmission path between the crankshaft 99 of the engine 14 and the electric motor MG, and the second damper 122 inserted in the power transmission path between the electric motor MG and the input shaft 48 and inserted in the power transmission path between the first damper 102 and the turbine 42 to partially overlap with the first damper 102 when viewed in the direction orthogonal to the first axial center C1. As a result, since the axial length of the outer shell cover of the torque converter 18 can be made shorter as compared to the case that the first damper 102 and the second damper 122 are not overlapped with each other when viewed in the direction orthogonal to the first axial center C1, the entire axial length of the vehicle power transmission device 12 can be made shorter.

According to the vehicle power transmission device 12 of this embodiment, the second damper 122 is disposed on the outer circumferential side of the first damper 102. This enables a longer stroke of the second damper 122 and, for example, the effect of suppressing noise and vibration such as booming noise in a vehicle can be enhanced in the second damper 122. Since the first damper 102 is disposed on the inner circumferential side of the second damper 122, it becomes easier to ensure the strength of the input member of the first damper 102 subjected to engine explosion fluctuations.

Although one embodiment of the present invention has been described in detail with reference to the drawings, the present invention is not limited to this embodiment and may be implemented in other forms.

For example, although the lockup clutch 120 is disposed on the outer circumferential side of the engine intermittent clutch K0 in the embodiment, the lockup clutch 120 may be disposed on the inner circumferential side of the engine intermittent clutch K0.

Although the lockup clutch 120 is a single plate clutch and the engine intermittent clutch K0 is a multiplate clutch in the embodiment, this is not a limitation and the lockup clutch 120 may be a multiplate clutch while the engine intermittent clutch K0 is a single plate clutch. In short, at least one of the lockup clutch 120 and the engine intermittent clutch K0 may be a single plate clutch.

For example, although the second damper 122 is disposed on the outer circumferential side of the first damper 102 in the embodiment, the second damper 122 may be disposed on the inner circumferential side of the first damper 102.

For example, although the second damper 122 is disposed to partially overlap with the first damper 102 when viewed in the direction orthogonal to the first axial center C1 in the embodiment, the second damper 122 may not necessarily be disposed to partially overlap with the first damper 102.

Although the torque converter 18 includes the electric motor MG disposed on the second axial center C2 parallel to the first axial center C1 of the torque converter 18 in the embodiment, the electric motor MG may not necessarily be included. Even if the torque converter 18 includes the electric motor MG, the electric motor MG may not be included on the second axial center C2 parallel to the first axial center C1. The electric motor MG may be included on the first axial center C1.

Although the vehicle power transmission device 12 includes the torque converter 18 having the torque amplification effect in the embodiment, the torque converter 18 may not necessarily be included as long as, for example, a hydraulic power transmission device of another type such as a fluid coupling having the pump blades 40 and the turbine blades 44 is included.

Although the vehicle power transmission device 12 includes the automatic transmission 20 on the subsequent stage of the torque converter 18 in the embodiment, the automatic transmission 20 may not necessarily be included as long as a power transmission mechanism is included that has an input shaft coupled to the turbine 42 of the torque converter 18 to transmit power input to the input shaft to the subsequent stage.

Although the electric motor MG is operatively coupled to the rear cover 38 that is the input-side rotating member of the torque converter 18 via the endless annular transmission chain 88 wrapped around the first electric motor coupling gear 82 and the second electric motor coupling gear 86 in the embodiment, the electric motor MG may operatively be coupled to the rear cover 38 via, for example, a gear pair, instead of the transmission chain 88.

Although the input shaft 48 of the automatic transmission 20 is rotatably supported on the inner circumferential side of the stator shaft 62 via the bush 66 by the stator shaft 62 in the embodiment, the bush 66 is not a limitation and the input shaft 48 may be supported by other bearing members such as a needle roller bearing (needle bearing), for example.

Although the stator shaft 62 is integrally disposed on the pump cover 50 to be always non-rotatable in the embodiment, the stator shaft 62 may not always be non-rotatable. For example, the stator shaft 62 may be coupled to an output shaft of an electric motor and rotated by the electric motor to change a capacitive coefficient of the torque converter 18, or may be coupled to the pump cover 50 via a brake and selectively switched between a rotatable state and a non-rotatable state by the brake to change the capacitive coefficient of the torque converter 18.

Although the vehicle power transmission device 8 is transversely mounted along with the engine 14 on the front side of the FF (front-engine front-drive) type vehicle 6 in the embodiment, this is not a limitation and, for example, the vehicle power transmission device 12 may longitudinally or transversely be mounted on vehicles of other drive types such as an FR (front-engine rear-drive) type vehicle or an RR (rear-engine rear-drive) type vehicle.

The described embodiment is a merely exemplary embodiment and, although not exemplarily illustrated one by one, the present invention may be implemented in variously modified and improved forms based on the knowledge of those skilled in the art without departing from the spirit thereof.

EXPLANATIONS OF LETTERS OR NUMERALS

12: vehicle power transmission device
14: engine
16: drive wheels
18: torque converter (hydraulic power transmission device)
20: automatic transmission (power transmission mechanism)
22: transaxle case (case)
24: oil pump
36*a*: side wall portion (engine-side wall portion)
38: rear cover (input-side rotating member)
40: pump blades
42: turbine (output-side rotating member)
44: turbine blades
48: input shaft
99: crankshaft
102: first damper
120: lockup clutch
122: second damper
124: lockup clutch piston (piston member)
130: release-side oil chamber (oil chamber)
K0: engine intermittent clutch
MG: electric motor
C1: first axial center (axial center of the hydraulic power transmission device)
C2: second axial center (second axial center)

The invention claimed is:

1. A vehicle power transmission device having a hydraulic power transmission device and a power transmission mechanism in a power transmission path between an engine and drive wheels, the hydraulic power transmission device including an input-side rotating member disposed with a plurality of pump blades and an output-side rotating member disposed with a plurality of turbine blades receiving a fluid flow from the pump blades, the power transmission mechanism transmitting power input to an input shaft from the hydraulic power transmission device to a subsequent stage, the input-side rotating member being provided with the pump blades internally disposed on a side of the power transmission mechanism, and the input-side rotating member housing the output-side rotating member disposed with the turbine blades opposite to the pump blades and fluid flowing from the pump blades to the turbine blades, the vehicle power transmission device having an engine intermittent clutch and a lockup clutch disposed closer to the engine relative to the turbine blades in the input-side rotating member, the engine intermittent clutch selectively coupling a crankshaft of the engine to the input-side rotating member, the lockup clutch selectively coupling the input-side rotating member to the output-side rotating member, one of the engine intermittent clutch and the lockup clutch being a single plate clutch, the vehicle power transmission device further comprising an electric motor disposed on a second axial center parallel to an axial center of the hydraulic power transmission device and operatively coupled to the input-side rotating member, the hydraulic power transmission device including a first damper inserted in a power transmission path between the crankshaft of the engine and the electric motor, and a second damper inserted in a power transmission path between the first damper and the output-side rotating member within a power transmission path between the electric motor and the input shaft of the power transmission mechanism to partially or entirely overlap with the first damper when viewed in the direction orthogonal to the axial center, the engine intermittent clutch being coupled to the crankshaft through the first damper, and a disk-shaped piston member being coupled to the output-side rotating member through the second damper.

2. The vehicle power transmission device of claim 1, wherein the lockup clutch is a friction engagement clutch including the disk-shaped piston member coupled in a power transmittable manner to the output-side rotating member and disposed in a manner allowing movement toward and away from a side wall surface of the input-side rotating member, and a friction plate fixedly disposed on the side wall surface of the input-side rotating member or a surface of the disk-shaped piston member opposite to the side wall surface, such that torque is transmitted between the input-side rotating member and the disk-shaped piston member by frictionally engaging the input-side rotating member and the disk-shaped piston member via the friction plate.

3. The vehicle power transmission device of claim 2, wherein the engine intermittent clutch and the lockup clutch are disposed to partially or entirely overlap with each other when viewed in a direction orthogonal to the axial center of the hydraulic power transmission device.

4. The vehicle power transmission device of claim 3, wherein one of the engine intermittent clutch and the lockup clutch is a single plate clutch disposed on an outer circumferential side of the other clutch, and wherein
the other clutch is a multiplate clutch disposed on an inner circumferential side of the one of the clutches.

5. The vehicle power transmission device of claim 4, wherein the engine intermittent clutch is the multiplate clutch, and wherein the lockup clutch is the single plate clutch.

6. The vehicle power transmission device of claim 1, wherein the engine intermittent clutch and the lockup clutch are disposed to partially or entirely overlap with each other when viewed in a direction orthogonal to the axial center of the hydraulic power transmission device.

7. The vehicle power transmission device of claim 6, wherein one of the engine intermittent clutch and the lockup clutch is a single plate clutch disposed on an outer circumferential side of the other clutch, and wherein
the other clutch is a multiplate clutch disposed on an inner circumferential side of the one of the clutches.

8. The vehicle power transmission device of claim 7, wherein the engine intermittent clutch is the multiplate clutch, and wherein the lockup clutch is the single plate clutch.

9. The vehicle power transmission device of claim 1, wherein the second damper is disposed on an outer circumferential side of the first damper.

* * * * *